Figure 1:
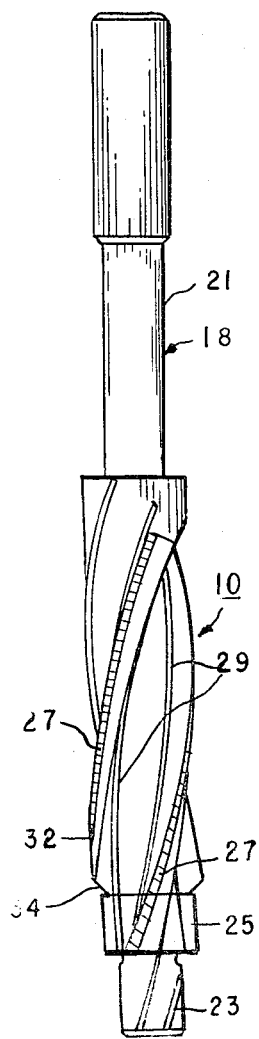

United States Patent [19]
Janci

[11] 3,824,027
[45] July 16, 1974

[54] REAMER
[76] Inventor: John Janci, 1125 N. Karlov, Chicago, Ill. 60651
[22] Filed: July 25, 1973
[21] Appl. No.: 382,320

[52] U.S. Cl.................................. 408/225, 408/230
[51] Int. Cl........................................... B23b 51/10
[58] Field of Search ........... 408/225, 224, 223, 201, 408/229, 230, 227, 199

[56] References Cited
UNITED STATES PATENTS
1,407,328  2/1922  Glenzer................................ 408/201
1,643,679  9/1927  Roderick ............................. 408/225

*Primary Examiner*—Gil Weidenfeld
*Attorney, Agent, or Firm*—Bernard L. Kleinke; Leonard J. Kalinowski

[57] ABSTRACT

A reamer adapted to be driven by a rotary machine to enlarge a hole in a plate in a single pass to accommodate a socket-head screw having a head portion and a shank portion with a single pass of the reamer, includes an elongated rodlike member having a rear end portion adapted to be attached to the machine, and a front non-cutting cylindrical portion having a diameter slightly less than the diameter of the hole to serve as a guide therein and having an axial length substantially less than the axial length of the hole. An intermediate enlarged cylindrical cutting portion has spirally-extending cutting edges thereon and spirally-extending material-guiding grooves therebetween, the diameter and the axial length of the intermediate portion being slightly larger than the corresponding diameter and axial length of the head portion of the screw to enlarge the hole to receive the head portion of the screw. A still further enlarged intermediate beveling portion is disposed to the rear of the cutting portion for shaping the plate surrounding the hole.

4 Claims, 2 Drawing Figures

PATENTED JUL 16 1974　　　　　　　　　　　　　　　　　　3,824,027

REAMER

The present invention relates to a reamer, and it more particularly relates to a reamer adapted to enlarge a hole to accommodate a socket-head screw flush therein with a single pass of the reamer into and out of the plate.

Socket-head screws adapted to be inserted into and extend through a hole in a plate are usually disposed with the shank portion of the screw within the hole for fastening purposes and with the head of the screw mounted within a countersunk bore or enlarged portion of the hole so that the head of the screw is mounted flush with the surface of the plate. It would be highly desirable to have a reamer which would be adapted to enlarge the hole to form the countersunk portion for the head of the screw in a fast and efficient manner. Such a reamer should be relatively inexpensive to manufacture and extremely easy to use without the necessity of having highly skilled and trained personnel.

The principal object of the present invention is to provide a new and improved reamer for enlarging holes through a plate for accommodating the head and shank portion of a socket-head screw.

Briefly, the above and further objects are realized in accordance with the present invention by providing a reamer adapted to be driven by a rotary machine to enlarge a hole in a plate to accommodate a socket-head screw having a head portion and a shank portion. The reamer includes an elongated rodlike member having a rear end portion adapted to be attached to the machine, and a front non-cutting cylindrical portion having a diameter slightly less than the diameter of the hole to serve as a guide therein and having an axial length substantially less than the axial length of the hole. An intermediate enlarged cylindrical cutting portion of the rodlike member has a spirally-extending cutting edge thereon and has spirally-extending material-guiding grooves therebetween, the cutting portion having a diameter and an axial length slightly larger than the corresponding diameter and axial length of the head portion of the screw to enlarge the hole to receive the head portion of the screw. A still further enlarged intermediate cylindrically-shaped beveling portion is disposed to the rear of the cutting portion for shaping the plate surrounding the hole.

Figure 2:
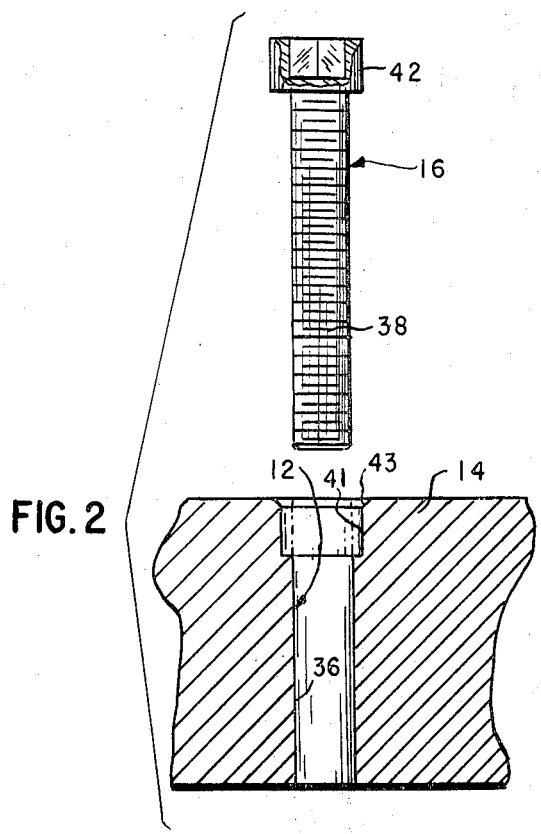

Other objects and advantages of the present invention will become apparent from a reading of the following detailed description and the accompanying sheet of drawings, wherein:

FIG. 1 is an elevational view of a reamer constructed in accordance with the present invention; and FIG. 2 is a cross-sectional, partly broken-away view of a conventional socket-head screw which may be positioned within a hole made by the reamer of FIG. 1 in a plate.

Referring now to the drawings, and more particularly to FIG. 1 thereof, there is shown a reamer 10, which is constructed in accordance with the present invention, and which is adapted to form a hole 12 (FIG. 2) extending through a plate 14 for accommodating a conventional socket-head screw 16 of FIG. 2. The reamer 10 generally comprises a rodlike member 18 having a rear shank portion 21 adapted to be removably and drivingly attached to a chunk of a rotary machine (not shown), a front non-cutting cylindrical tip portion 23 to serve as a guide for entering the hole 12, an intermediate enlarged cylindrical cutting portion 25 having spirally-extending cutting edges 27 thereon and spirally-extending material-guiding grooves 29, and a still further enlarged intermediate cylindrically-shaped beveling portion 32 and having a beveling shoulder 34 disposed between the shank portion 21 and the enlarged cutting portion 25 to bevel the plate 14 at the face thereof.

In use, a cylindrical unthreaded hole 36 of uniform cross-sectional area is drilled or otherwise formed in the plate 14 as an initial step in the operation of forming the hole 12. The diameter of the hole 36 is slightly larger than the threaded shank portion 38 of the screw 16 for loosely receiving it, the upper portion of the initial hole 36 being illustrated in broken lines in FIG. 2. Thereafter, the rear portion 21 of the reamer 10 may be mounted to a suitable rotary machine and the reamer is then driven rotatably about its axis and advanced axially into the hole 36. The front end portion 23 serves to center the reamer as it moves into the hole 36, but the portion does not cut the plate 14. When the enlarged cutting portion 25 enters the hole 36, it enlarges the hole to form the unthreaded countersunk bore portion 41, which is slightly larger in diameter than the diameter of the head 42 of the screw 16 by an exact predetermined amount to loosely receive it. When the still further enlarged beveling portion 32 engages the plate 14, the portion 32 bevels the face of the plate 14 surrounding the enlarged countersunk portion 41 of the hole 12 to form the annular groove 43 to complete the hole 12. Once the groove 43 is formed, the reamer 10 is backed out of the thus-formed hole 12. Thus, in accordance with the present invention, the hole 36 may be quickly and accurately enlarged to form the hole 12 with a single pass of the reamer 10. The non-cutting bladeless tip portion 23 readily guides the reamer 10 through the initial hole 36, and the beveling on the surface of the plate 14 immediately alerts the operator that the depth of the enlarged countersunk portion 41 is substantially the same as the axial length of the head 42, and that the reamer should be backed out of the hole since the axial length of the head 42 is substantially equal to the axial length of the portion 25. Thus, there is no need for continuously withdrawing the reamer 10 and measuring the depth of the portion 41, and a correct sized and shaped hole 12 may be formed quickly and efficiently by an operator who need not be a highly skilled operator.

Considering now the reamer in greater detail, the grooves 29 are a pair of spiral grooves extending parallelly and continuously about the portions 23, 25 and 32. The plurality of blades or edges 27 extend parallelly about the two intermediate portions 25 and 32 only and not about the tip portion 23, which does not remove material from the plate 14 and serves the purpose of guiding the axial advancement and retraction of the reamer 10 within the hole 36.

The annular shoulder 34 is inclined at an angle of about 45° relative to the axis of the reamer 10 to shape the beveled groove 43.

In accordance with the present invention, the intermediate cutting portion 25 is generally cylindrical in shape and has an axial length approximately equal to and is slightly greater than the depth of the axial length of the head 42. The diameter of the portion 25 is approximately equal to and is slightly greater than the diameter of the head 42.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

I claim:

1. A reamer adapted to be driven by a rotary machine to enlarge a hole in a plate to accommodate a socket-head screw having a head portion and a shank portion, comprising: an elongated rodlike member including a rear end portion adapted to be removably and drivingly attached to the machine, a front non-cutting cylindrical portion having a diameter slightly less than the diameter of the hole to serve as a guide therein and having an axial length substantially less than the axial length of the hole, an intermediate enlarged cylindrical cutting portion having spirally-extending cutting edges thereon and spirally-extending material-guiding grooves therebetween and having a diameter and an axial length slightly larger than the corresponding diameter and axial length of the head portion of the screw to enlarge the hole to receive the head portion of the screw, and a still further enlarged intermediate cylindrically-shaped beveled cutting portion to the rear of said cylindrical cutting portion for shaping the face of the plate surrounding the hole.

2. A reamer according to claim 1, wherein said front portion terminates a relatively short axial distance from said intermediate enlarged cutting portion.

3. A reamer according to claim 2, wherein said cutting edges extend continuously and spirally axially only about said cutting portion and about said beveled cutting portion, said grooves extending continuously about said front portion and said intermediate portions.

4. A reamer according to claim 1, wherein said cutting edges extend continuously and spirally axially only about said cutting portion and about said beveled cutting portion, said grooves extending continuously about said front portion and said intermediate portions.

* * * * *